(12) United States Patent
Taniguchi (10) Patent No.: US 9,865,847 B2
(45) Date of Patent: *Jan. 9, 2018

(54) OUTER PACKAGE MATERIAL FOR LITHIUM-ION BATTERY AND METHOD FOR PRODUCING LITHIUM-ION BATTERY USING THE OUTER PACKAGE MATERIAL

(71) Applicant: TOPPAN PRINTING CO., LTD., Taito-ku, Tokyo (JP)

(72) Inventor: Tomoaki Taniguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,662

(22) Filed: Nov. 29, 2016

(65) Prior Publication Data

US 2017/0077465 A1 Mar. 16, 2017

Related U.S. Application Data

(63) Continuation-in-part of application No. 14/530,948, filed on Nov. 3, 2014, now Pat. No. 9,627,660, which (Continued)

(30) Foreign Application Priority Data

May 10, 2012 (JP) ................................ 2012-108355

(51) Int. Cl.
*H01M 2/02* (2006.01)
*H01M 2/08* (2006.01)
(Continued)

(52) U.S. Cl.
CPC ............. *H01M 2/0287* (2013.01); *B32B 1/02* (2013.01); *B32B 7/12* (2013.01); *B32B 15/085* (2013.01);
(Continued)

(58) Field of Classification Search
CPC .. H01M 2/0287; H01M 2/026; H01M 2/0267; H01M 2/08; H01M 2/0285;
(Continued)

(56) References Cited

U.S. PATENT DOCUMENTS

2009/0191448 A1* 7/2009 Yamamoto .............. B29C 70/72
429/94
2010/0015451 A1* 1/2010 Suzuta .................... B32B 15/08
428/424.8
2013/0149597 A1 6/2013 Suzuta et al.

FOREIGN PATENT DOCUMENTS

JP 2001-176458 A 6/2001
JP 2002056824 A * 2/2002
(Continued)

OTHER PUBLICATIONS

International Search Report dated Aug. 6, 2013 issued in Application No. PCT/JP2013/062912.
(Continued)

*Primary Examiner* — Gregg Cantelmo
(74) *Attorney, Agent, or Firm* — Foley & Lardner LLP (57) ABSTRACT

A lithium-ion battery outer package material, provided with: a base layer, and a first adhesive layer, a metallic foil layer, a corrosion prevention treatment layer, a second adhesive layer, and a sealant layer sequentially layered on one of the surfaces of the base layer. When a tensile test (a sample of the substrate layer is stored for 24 hours in a 23° C. and 40% RH environment; a tensile test is subsequently performed in a 23° C. and 40% RH environment with the specimen width being 15 mm, the distance between gauge points being 50 mm, and the tensile speed being 100 mm/min; and the tensile elongation and tensile stress of the specimen are measured) is performed, the tensile elongation in a first direction, which is either the TD direction or the MD direction of the sample, relative to the length of the sample (Continued)

is from about not less than 50% to less than 80%, and the tensile stress in a second direction, which is perpendicular to the first direction, is from about not less than 150 to 230 MPa.

12 Claims, 2 Drawing Sheets

Related U.S. Application Data is a continuation of application No. PCT/JP2013/062912, filed on May 8, 2013.

(51) Int. Cl.
    *H01M 10/0525*    (2010.01)
    *B32B 1/02*    (2006.01)
    *B32B 7/12*    (2006.01)
    *B32B 15/085*    (2006.01)
    *B32B 15/088*    (2006.01)
    *B32B 15/09*    (2006.01)
    *B32B 15/20*    (2006.01)
    *B32B 27/08*    (2006.01)
    *B32B 27/32*    (2006.01)
    *B32B 27/34*    (2006.01)
    *B32B 27/36*    (2006.01)

(52) U.S. Cl.
    CPC ............ *B32B 15/088* (2013.01); *B32B 15/09* (2013.01); *B32B 15/20* (2013.01); *B32B 27/08* (2013.01); *B32B 27/32* (2013.01); *B32B 27/34* (2013.01); *B32B 27/36* (2013.01); *H01M 2/026* (2013.01); *H01M 2/0267* (2013.01); *H01M 2/08* (2013.01); *B32B 2255/06* (2013.01); *B32B 2307/306* (2013.01); *B32B 2307/31* (2013.01); *B32B 2307/52* (2013.01); *B32B 2307/54* (2013.01); *B32B 2307/581* (2013.01); *B32B 2307/714* (2013.01); *B32B 2307/7265* (2013.01); *B32B 2307/738* (2013.01); *B32B 2439/40* (2013.01); *B32B 2457/10* (2013.01); *H01M 2/0285* (2013.01); *H01M 10/0525* (2013.01)

(58) Field of Classification Search
    CPC ........ H01M 10/0525; B32B 1/02; B32B 7/12; B32B 15/085; B32B 15/088; B32B 15/09; B32B 15/20; B32B 27/08; B32B 27/32; B32B 27/34; B32B 27/36; B32B 2255/06; B32B 2307/306; B32B 2307/31; B32B 2307/52; B32B 2307/54; B32B 2307/581; B32B 2307/714; B32B 2307/7265; B32B 2307/738; B32B 2439/40; B32B 2457/10
    See application file for complete search history.

(56) References Cited

FOREIGN PATENT DOCUMENTS

| | | |
|---|---|---|
| JP | 03-567230 B2 | 6/2004 |
| JP | 2005-022336 A | 1/2005 |
| JP | 2006-228653 A | 8/2006 |
| JP | 2006-236938 A | 9/2006 |
| JP | 2011-060501 A | 3/2011 |
| JP | 2011076956 A * | 4/2011 |
| JP | 2011-181218 A | 9/2011 |
| JP | 2011-187385 A | 9/2011 |
| JP | 2011-216390 A | 10/2011 |
| WO | WO-2012/033133 A1 | 3/2012 |

OTHER PUBLICATIONS

J-Plat Pat machine translation of the detailed description of JP 2011060501 A (Mar. 2011).
J-Plat Pat machine translation of the detailed description of JP 2011187385A (Sep. 2011).
J-Plat Pat machine translation of the detailed description of JP 2011216390A (Oct. 2011).

* cited by examiner

OUTER PACKAGE MATERIAL FOR LITHIUM-ION BATTERY AND METHOD FOR PRODUCING LITHIUM-ION BATTERY USING THE OUTER PACKAGE MATERIAL

CROSS-REFERENCE TO RELATED PATENT APPLICATIONS

This application is a continuation-in-part of U.S. patent application Ser. No. 14/530,948, filed on Nov. 3, 2014, granted as U.S. Pat. No. 9,627,660 on Apr. 18, 2017, which is a continuation application filed under 35 U.S.C. 111(a) claiming the benefit under 35 U.S.C. §§120 and 365(c) of PCT International Application No. PCT/JP2013/062912 filed on May 8, 2013, which is based upon and claims the benefit of priority of Japanese Application No. 2012-108355 filed on May 10, 2012, the entire contents of which are hereby incorporated by reference in their entireties.

BACKGROUND

Technical Field

The present invention relates to an outer package material for a lithium-ion battery and a method for producing a lithium-ion battery using the outer package material.

Background Art

Nickel hydride and lead storage batteries are known to be used as secondary batteries. The downsizing of secondary batteries, however, is required because of the downsizing of mobile devices, limitations of installation space, etc. Accordingly, attention is being paid to a lithium-ion battery having high energy density. As an outer package material (referred to as an "outer package material" herein) to use in a lithium-ion battery, although a metallic can was used conventionally, a multiple-layered film has been used that is light, has high radiation performance and can be applied at low cost.

An electrolytic solution of a lithium-ion battery contains an aprotic solvent such as propylene carbonate, ethylene carbonate, diethyl carbonate or ethylmethyl carbonate, and an electrolyte. As a lithium salt which is an electrolyte, lithium salts such as $LiPF_6$ or $LiBF_4$ are used. These lithium salts, however, generate hydrofluoric acid because of a hydrolysis reaction with water. Hydrofluoric acid causes corrosion on a metallic surface of a battery member or decreases the laminate bond strength between layers of the outer package material made of a multiple-layered film.

Accordingly, an aluminum foil layer is provided inside an outer package material made of a multiple-layered film, which prevents water from entering through the surface of the multiple-layered film. For example, an outer material wherein a base layer having heat-resistance/a first adhesive layer/an aluminum foil layer/a corrosion prevention treatment layer which prevents corrosion due to hydrofluoric acid/a second adhesive layer/a sealant layer are sequentially layered is known. The lithium-ion battery where the above-described outer package material is used is called a lithium-ion battery of aluminum laminate type.

As the lithium-ion battery of aluminum laminate type, a lithium-ion battery of embossed type is known. In this lithium-ion battery of embossed type, a recess is formed on a part of the outer package material by cold molding, battery contents (a positive electrode, a separator, a negative electrode, an electrolytic solution, etc.) are accommodated in the recess, the rest of the outer package material is folded, and edge portions are sealed by heat-sealing. Recently, in order to increase energy density, a lithium-ion battery where recesses are formed on both two outer package materials to be stuck together has been produced. This type of lithium-ion battery can accommodate more battery contents.

The energy density of the lithium-ion battery is increased as the depth of the recess formed by cold molding is increased. However, a pinhole or breaking readily occurs at the outer package material in molding as the depth of the formed recess is increased. Accordingly, biaxially-stretched polyamide film has been used for the base layer of the outer package material to protect the metallic foil.

Here, as an example for improving moldability, it has been suggested that a film can be used wherein the film's tensile strengths in four directions, 0°, 45°, 90° and 135°, until occurrence of any breaking in a tensile test are 150 MPa, and elongations in the four directions are 80% or more (for example, see PTL 1).

CITATION LIST

Patent Literature

[PTL1] Japanese Patent No. 3567230

SUMMARY OF THE INVENTION

Technical Problem

In the art of PTL1, however, no regard is given to warpage after molding. Therefore, there is the following problem: When the outer package material is subjected to a molding process stretching it, warpage occurs because the stretched base layer tends to return to its original state. This warpage cannot be improved.

The present invention has been made so as to improve or solve the above problem, and provide an outer package material for a lithium-ion battery and a method for producing a lithium-ion battery using the outer package material, which can decrease warpage after molding, while keeping sufficient or excellent moldability.

Solution to Problem

For trying to solve the above-described problem, the present invention suggests the following aspects:

An outer package material for a lithium-ion battery of an aspect of the present invention has: a base layer; a first adhesive layer; a metallic foil layer; a corrosion prevention treatment layer; a second adhesive layer; and a sealant layer, the first adhesive layer, the metallic foil layer, the corrosion prevention treatment layer, the second adhesive layer and the sealant layer being sequentially layered on one of surfaces of the base layer, wherein, in the following tensile test: tensile elongation in a first direction of a specimen of the base layer to length of the specimen is from about not less than 50% to less than 80%, the first direction being one of an MD direction and a TD direction of the specimen of the base layer; and tensile stress in a second direction is from about not less than 150 MPa to not more than 230 MPa, the second direction being perpendicular to the first direction.

(Tensile Test)

After storing the specimen in an environment of 23° C. and 40% RH for 24 hours, the tensile test is carried out under an environment of 23° C. and 40% RH and under conditions of 15 mm in width of the specimen, 50 mm in distance between gauge points and 100 mm/minute in tensile rate, and tensile elongation and tensile stress of the specimen are measured.

In the aspect of the present invention, tensile elongation in the first direction of about 50% or more can prevent breaking of the base layer due to stretching of the outer package material during molding, the first direction being one of the MD direction and the TD direction of the tensile test of the base layer.

The tensile elongation under about 80% can keep the strength of the base layer and can improve moldability.

When tensile stress in the other direction (the second direction perpendicular to the first direction) in the tensile test is from about not less than 150 MPa to not more than 230 MPa, contraction of the outer package material after molding can be prevented, thereby decreasing warpage of the outer package material.

It is preferred that, in the outer package material of another aspect of the present invention, the base layer is made of polyamide or polyester, and thickness of the base layer is from about not less than 10 µm to not more than 40 µm.

In the aspect of the present invention, the thickness of base layer of 10 µm or more can increase moldability of the outer package material.

Further, the thickness of base layer of 40 µm or less can reduce the degree of contraction at a portion stretched by molding of the base layer, which causes the shape of the outer package material after molding to be kept, and enables decrease in warpage of the outer package material.

It is preferred that, in the outer package material of another aspect of the present invention, the base layer is a film stretched by a sequentially biaxial stretching method.

In the aspect of the present invention, because the base layer has anisotropy in mechanical properties, contraction of the outer package material after molding can be lessened or prevented, thereby decreasing warpage of the outer package material.

A method for producing a lithium-ion battery using the outer package material for a lithium-ion battery of another aspect of the present invention has the step of molding the outer package material such that, in the base layer, a fold portion is formed in a direction perpendicular to another direction where the tensile stress of the base layer is from about not less than 150 MPa to not more than 350 MPa (for example, such that a portion to form a fold lid portion and a periphery edge portion of the molding area are overlaid on each other).

This can prevent contraction of the outer package material after molding of the outer package material, thereby decreasing warpage of the outer package material.

Advantageous Effects of Invention

According to the outer package material of the present invention, flexibility and strength of the base layer can be kept, which causes the outer package material to be keep improved or excellent moldability. Further, contraction of the outer package material after molding can be prevented, which causes the warpage of the outer package material to be lower.

DETAILED DESCRIPTION

Hereinafter is described an embodiment according to the present invention, referring to FIG. 1.

Figure 1:
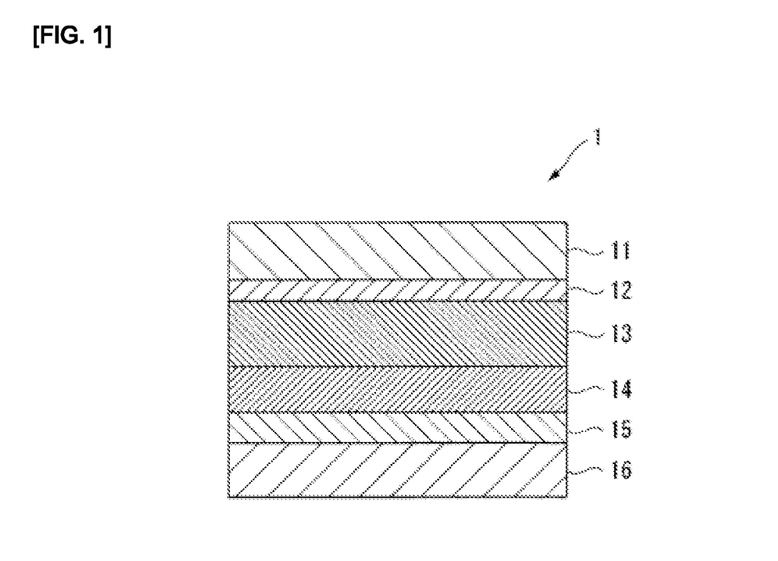
FIG. 1 is a cross-sectional view schematically showing a configuration of an outer package material for a lithium-ion battery of the present invention.

As shown in FIG. 1, an outer package material 1 for a lithium-ion battery (referred to as an "outer package material" herein) of this embodiment is a laminate where, on one surface of a base layer 11 having a sheet form, a first adhesive layer 12, a metallic foil layer 13, a corrosion prevention treatment layer 14, a second adhesive layer 15 and a sealant layer 16, which each also have sheet shapes, are laminated sequentially. In the outer package material 1, the base layer 11 is the outermost layer, and the sealant layer 16 is the innermost layer. That is, the outer package material 1 is used with the base layer 11 arranged at the outer side (the outer surface) of the battery and the sealant layer 16 arranged at the inner side (the inner surface) of the battery.

[Base Layer 11]

The base layer 11 has a function of giving heat resistance during a sealing step in the production of the lithium-ion battery, and another function of preventing occurrence of pinholes which might occur in production or distribution.

The base layer 11 is a layer made of a resin film whose tensile elongation in one direction (first direction) of a MD direction and a TD direction in the tensile test described below is from about not less than 50% to less than 80%, and whose tensile stress in the other direction (second direction perpendicular to the above-described first direction) is from about not less than 150 MPa to not more than 230 MPa.

It is preferred that, in the base layer 11, tensile elongation in the TD direction in the tensile test described below is from about not less than 50% to less than 80% and tensile stress in the MD direction is from about not less than 150 MPa to not more than 230 MPa.

It is further preferred that, in the base layer 11, tensile elongation in the TD direction is 75% and tensile stress in the MD direction is 200 MPa or less.

Here, MD direction is an abbreviation of Machine Direction, a flow direction in production of the base layer 11. TD direction is an abbreviation of Transverse Direction, a direction perpendicular to the MD direction.

(Tensile Test)

After storing a specimen of the above-described base layer under a condition of 23° C. and 40% RH for 24 hours, tensile test of the above-described specimen is carried out under an environment of 23° C. and 40% RH, and under conditions of 15 mm in specimen width, 50 mm in distance between gauge points, and 100 mm/minute in tensile rate, thereby measuring the above-described tensile elongation of the specimen and the above-described tensile stress of the specimen.

It is preferred that a film of polyamide (nylon) or polyester, which is high in strength, large in elongation and flexible, is used as the base layer 11 for forming a thin and sharp shape. In view of its excellent piercing strength and impact strength, biaxially-stretched nylon (Ny) film or biaxially-stretched polyethylene terephthalate (PET) film is more preferable.

Of these, biaxially-stretched nylon film is further preferred because of having relatively more excellent moldability.

It is preferred that the thickness of the base layer 11 is about 10-40 µm, more preferably 20 µm-35 µm. The base layer 11 having thickness of 10 µm or more has excellent moldability. If the thickness of the base layer 11 is 40 μm or less, then the degree of contraction of parts elongated by molding of the base layer 11 do not increase comparatively, which allows the outer package material 1 to better keep its shape after molding.

As the base layer 11, in view of reducing warpage after molding of the outer package material 1, sequentially biaxially stretched nylon film stretched by a sequentially biaxial stretching method and having anisotropy in mechanical properties is preferred.

[First Adhesive Layer 12]

The first adhesive layer 12 is a layer bonding the base layer 11 and the metallic foil layer 13.

As adhesive agents configuring the first adhesive layer 12, two-pack curing type urethane-based adhesives are preferred. In the two-pack curing type urethane-based adhesives, a base compound such as polyester polyol, polyether polyol, or acrylic polyol is reacted with an aromatic or an aliphatic isocyanate compound having two or more functional groups and serving as a curing agent.

The above urethane-based adhesive is subjected to aging, for example, at 40° C. for four or more days after coating to promote the reaction of hydroxyl groups of the base compound and isocyanate groups of the curing agent, which enables strong adhesion.

It is preferred that the thickness of the first adhesive layer 12 is about 1-10 μm in view of adhesion strength and moldability, or in order to obtain following ability (for reliably forming the first adhesive layer 12 on the member to be provided with the first adhesive layer 12 without peeling off, even when the member deforms, expands and contracts). Further preferably, the thickness is 3-7 μm.

[Metallic Foil Layer 13]

As the metallic foil layer 13, metallic foils such as aluminum or stainless steel can be used. Of these, in view of cost and formability such as of moisture-proof properties, ductility and malleability, aluminum foils are preferred. As aluminum foils, general soft aluminum foils can be used. Of these, aluminum foil containing iron is preferred because of excellent pinhole-resistance, ductility and malleability in molding.

It is preferred that the iron content in the aluminum foil (100 mass %) containing iron is 0.1-9.0 mass %, more preferably 0.5-2.0 mass %. If the iron content is 0.1 mass % or more, then the outer package material 1 has excellent pinhole-resistance, ductility and malleability. If the iron content is 9.0 mass % or less, then the outer package material 1 has improved or excellent flexibility.

It is preferred that the thickness of the metallic foil layer 13 is 9-200 μm in view of barrier properties, pinhole-resistance and formability, and more preferably 15-100 μm.

[Corrosion Prevention Treatment Layer 14]

The corrosion prevention treatment layer 14 has a function of decreasing or preventing corrosion of the metallic foil layer 13 due to hydrofluoric acid which is generated because of an electrolytic solution or a reaction of an electrolytic solution and water. Also, the corrosion prevention treatment layer 14 has another function of increasing adhesion force to the metallic foil layer 13 and to the second adhesion layer 15.

As the corrosion prevention treatment layer 14, coating films formed from coating type or immersion type corrosion prevention treatment agents having acid resistance are preferred. The aforementioned coating film is excellent in corrosion prevention effect of the metallic foil layer 13 to acids. Excellent resistance against the contents such as an electrolytic solution can be obtained, because the adhesion force to the metallic foil layer 13 and to the second adhesion layer 15 is further strengthened by an anchor effect. The corrosion prevention treatment layer 14 may be added to between the first adhesive layer 12 and the metallic foil layer 13, depending on necessary functions.

The above-described coating film can include, for example, a coating film formed by ceria sol treatment with a corrosion prevention treatment agent made of cerium oxide, phosphoric acid and a thermosetting resin, a coating film formed by chromate treatment with chromate, phosphate, a corrosion prevention treatment agent made of fluoride and a thermosetting resin, or the like.

It will be noted that the corrosion prevention treatment layer 14 is not limited to the above-described coating film, as long as a coating film provides sufficient corrosion resistance of the metallic foil layer 13. For example, coating films formed by phosphate treatment, boehmite treatment, or the like may be used.

The corrosion prevention treatment layer 14 may be a single layer or a laminate. Additives such as silane-based coupling agent may be added to the corrosion prevention treatment layer 14.

It is preferred that the thickness of the corrosion prevention treatment layer 14 is 10 nm-5 μm in view of corrosion prevention function and function as an anchor, more preferably 20-500 nm.

[Second Adhesive Layer 15]

The second adhesive layer 15 is a layer bonding the metallic foil layer 13 on which the corrosion prevention treatment layer 14 is formed, and the sealant layer 16. The outer package material 1 is broadly categorized into thermal lamination configurations and dry lamination configurations according to an adhesive component forming the second adhesive layer 15.

As the adhesive components forming the second adhesive layer 15 in the thermal lamination configurations, acid-modified polyolefin resins made by graft-modifying polyolefin resins with acids such as maleic acid anhydride are preferred. Because a polar group is introduced to a part of the non-polar polyolefin resin, the acid-modified polyolefin resin can adhere tightly to both of the non-polar sealant layer 16 made of a polyolefin film etc. and the polar corrosion prevention treatment layer 14. The use of the acid-modified polyolefin resin improves resistance against the contents such as an electrolytic solution. Also, even if hydrofluoric acid is generated within the battery, reduction in adhesion force to the corrosion prevention treatment layer 14 and to the sealant layer 16 due to deterioration of the second adhesion layer 15 is likely to be prevented.

The acid-modified polyolefin resins used in the second adhesive layer 15 may be one type, two or more types.

Polyolefin resins used for the acid-modified polyolefin resins can include, for example, low-density, medium-density or high-density polyethylene; ethylene-α olefin copolymer; homo-, block- or random polypropylene; propylene-α olefin copolymer; or the like. Also, the aforementioned compound copolymerized with a polar molecule such as acrylic acid or methacrylic acid, a polymer such as cross-linked polyolefin, or the like can be used.

The above acids modifying polyolefin resins can include carboxylic acid, epoxy compound, acid anhydride or the like. Maleic acid anhydride is preferred.

As the adhesive components configuring the second adhesive layer 15 having the thermal lamination configuration, maleic acid anhydride-modified polyolefin resin, which is made by graft-modifying polyolefin resin with maleic acid anhydride, is preferable. That is because adhesion force to the sealant layer 16 and to the metallic foil layer 13 is readily kept, even if the electrolytic solution osmoses. Maleic acid anhydride-modified polypropylene is especially preferable.

It is preferred that modification ratio of maleic acid anhydride-modified polypropylene by maleic acid anhydride (gross mass of maleic acid anhydride-modified polypropylene to mass of parts originated from maleic acid anhydride) is 0.1-20 mass %, more preferably 0.3-5 mass %.

It is preferred that a styrene elastomer or an olefin elastomer is contained in the second adhesive layer 15 having the thermal lamination configuration. This can readily prevent white turbidity of the outer package material due to occurrence of cracks in the second adhesive layer 15 during cold forming. Also, an increase in adhesion force to the corrosion prevention treatment layer 14 and to the sealant layer 16 due to improvement of wettability, an improvement of moldability of the second adhesive layer 15 due to reduction in anisotropy and so on can be expected. It is preferred that these elastomers are dispersed and dissolved at the order of nanometers (nanometer size) in acid-modified polyolefin resins.

The second adhesive layer 15 having the thermal lamination configuration can be formed by extruding the above adhesive component with an extrusion apparatus.

It is preferred that melt flow rate (MFR) of the adhesive component of the second adhesive layer 15 having the thermal lamination configuration is 4-30 g/10 minutes under conditions of 230° C. and 2.16 kgf.

It is preferred that the thickness of the second adhesive layer 15 having the thermal lamination configuration is 2-50 μm.

The adhesive component of the second adhesive layer 15 having the dry lamination configuration can include, for example, two-pack curing type polyurethane-based adhesive agent similar to the compound described in the first adhesive layer 12.

Because the second adhesive layer 15 having the dry lamination configuration has a coupling portion having high hydrolyzability, such as ester group, urethane group or the like, the second adhesive layer 15 having this thermal lamination configuration is preferable for uses demanding higher reliability.

[Sealant Layer]

The sealant layer 16 is a layer giving the outer package material 1 heat sealability.

The sealant layer 16 can be a resin film made of polyolefin resin or acid-modified polyolefin resin made by graft-modifying polyolefin resin with an acid such as maleic acid anhydride.

The above-described polyolefin resins can include, for example, low-density, medium-density or high-density polyethylene; ethylene-α olefin copolymer; homo-, block- or random polypropylene; propylene-α olefin copolymer; or the like. Of these polyolefin resins, one type singularly may be used, or two or more types may be used in combination.

The acid-modified polyolefin resins can include, for example, the same compounds as the compounds described in the second adhesive layer 15.

The sealant layer 16 may be a single-layer film or may be a multiple-layered film, and may be selected therefrom depending on necessary functions. For example, in view of giving moisture-proof properties, there can be used a multiple-layered film in which a resin such as ethylene-cyclic olefin copolymer or polymethylpentene is interposed.

Additives such as a fire-retardant, a slip agent, an anti-blocking agent, an oxidation inhibitor, a light stabilizer or a tackifier may be formulated in the sealant layer 16.

It is preferred that the thickness of the sealant layer 16 is 10-100 μm, more preferably 20-60 μm.

The outer package material 1 may be an outer package material where the sealant layer 16 is layered on the second adhesive layer 15 by dry laminating. However, it is preferred that the second adhesive layer 15 is made of acid-modified polyolefin resin and the sealant layer 16 is layered on the second adhesive layer 15 by sandwich laminating, in view of improving adhesion properties.

[Production Method]

Hereinafter is described a method for producing the outer package material 1. It will be noted that the method for producing the outer package material 1 is not limited to the following method.

As the methods for producing the outer package material 1, for example, there can be a method having the following steps (1) to (3).

Step (1) A step for forming the corrosion prevention treatment layer 14 on the metallic foil layer 13.

Step (2) A step for adhering the base layer 11 to an opposite surface of the metallic foil layer 13 with the first adhesive layer 12 therebetween. The opposite surface is opposite to the surface on which the corrosion prevention treatment layer 14 is formed.

Step (3) A step for adhering the sealant layer 16 on the surface of the metallic foil layer 13 with the second adhesive layer 15 therebetween. The surface of the metallic foil layer 13 is the surface on which the corrosion prevention treatment layer 14.

[Step (1)]

A corrosion prevention treatment agent is applied on one of surfaces of the metallic foil layer 13 by coating, followed by drying to form the corrosion prevention treatment layer 14. The corrosion prevention treatment agent can include, for example, a corrosion prevention treatment agent for ceria sol treatment or a corrosion prevention treatment agent for chromate treatment.

The coating method is not limited especially, and there can be adopted various methods such as gravure coating, reverse coating, roll coating, and bar coating.

[Step (2)]

To the other surface of the metallic foil layer 13, which is opposite to the surface on which the corrosion prevention treatment layer 14 is formed, the base layer 11 is adhered by a method such as dry laminating, using an adhesive agent forming the first adhesive layer 12.

In the step (2), for advancing adhesion properties, aging (curing) treatment may be carried out within a range of room temperature to 100° C.

[Step (3)]

The second adhesive layer 15 is formed by an extrusion laminating method on the corrosion prevention treatment layer 14 side of the laminate where the base layer 11, the first adhesive layer 12, the metallic foil layer 13 and the corrosion prevention treatment layer 14 are laminated in this order, followed by adhering a resin film forming the sealant layer 16 thereto. It is preferred that the lamination of the sealant layer 16 is performed by sandwich laminating.

The outer package material is obtained by the steps (1) to (3) described above.

It will be noted that the step order of the method for producing the outer package material 1 is not limited to the method performing the aforementioned steps (1) to (3) sequentially. For example, after performing step (2), step (1) may be performed.

Figure 2:
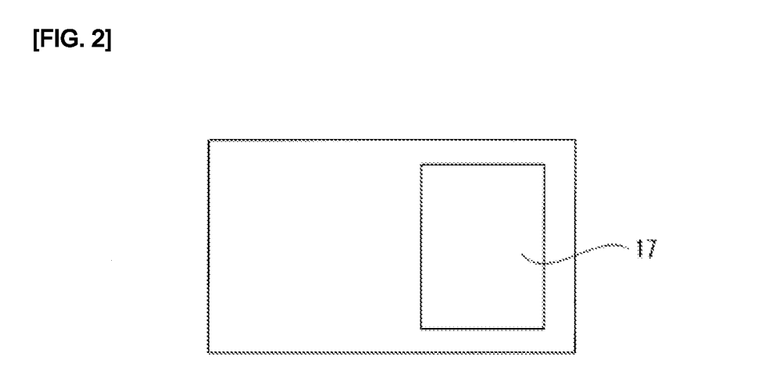
FIG. 2 is a plan view showing a molding area of the outer package material for a lithium-ion battery of the present invention.
Figure 3:
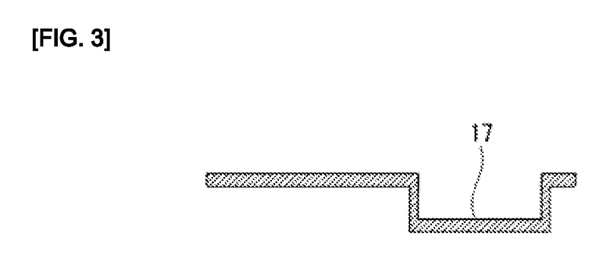
FIG. 3 is a cross-sectional view of FIG. 2 viewed from the bottom side.

Now is described an example of molding methods of the outer package material 1 in methods for producing the lithium-ion battery using the outer package material 1 of the present invention, by referring to FIG. 2 and FIG. 3.

It will be noted that here is described a molding method for forming a molding area 17 as a recess in processes for producing the lithium-ion battery. The molding area 17 is rectangular when the outer package material 1 is viewed from above (in the thickness direction thereof).

That is, this molding area 17 is formed by pressing a part of the outer package material 1 with a pressing member having a rectangular pressure surface toward the thickness direction of the outer package material 1. The area to be pressed, i.e. the molding area 17, is off-center arranged on one side portion (first portion) of the outer package material 1 cut into a sheet-like shape. After molding, the other side portion (second portion) is folded back. This allows the second portion to be formed as a lid.

It is preferred that this fold portion (line portion) is perpendicular to a direction in which tensile stress of the base layer 11 is from about not less than 150 MPa to not more than 350 MPa.

Thus, after molding the outer package material, the outer package material 1 is subjected to the following steps to produce the lithium-ion battery.

That is, after molding the molding 17 as the recess in the above steps, a positive electrode, a separator and a negative electrode are disposed in the recess, followed by folding the outer package material 1 to face the sealant layers, thereafter heat-sealing two sides of the outer edge of the folded outer package material. After that, under a vacuum condition, an electrolytic solution is injected from the remained side of the outer package material, followed by folding the remained side of the outer package material, heat-sealing to seal closely, thereby obtaining the lithium-ion battery.

It will be noted that the method for producing the lithium-ion battery using the outer package material for a lithium-ion battery of the present invention is not limited to the above-described method.

According to the above-described outer package material, the tensile elongation in the TD direction of the specimen of the base material in a tensile test of the base layer 11 is set at less than about 75%. This decreases or prevents excessive stretching or insufficient stretching, and enables improvement of moldability of the outer package material 1.

Further, the tensile stress in the MD direction of the specimen of the base layer in a tensile test of the base layer 11 is set at less than about 200 MPa. This enables reduction in warpage after molding.

20 μm-35 μm in thickness of the base layer 11 enables reduction in warpage after molding, keeping improved moldability of the outer package material 1.

A sequentially biaxially stretched nylon film forming the base layer 11 gives the base layer 11 anisotropy in mechanical properties, which enables reduction in warpage of the outer package material 1 after molding.

According to the method for producing a lithium-ion battery of this embodiment, molding is performed such that the fold portion is formed in a direction perpendicular to another direction in which the tensile stress of the base layer 11 is from about not less than 150 MPa to not more than 350 MPa. This enables reduction in warpage after molding.

EXAMPLES

Hereinafter, the present invention is described in detail with Examples. However, the present invention is not limited to the following description.

[Employed Materials]
Materials employed in Examples are shown below.
(Base Layer 11)
  Base A-1: Sequentially biaxially stretched Ny film
  Base A-2: Sequentially biaxially stretched Ny film
  Base A-3: Sequentially biaxially stretched Ny film
  Base A-4: Tubular method biaxially stretched Ny film
(First Adhesive Layer 12)
  Adhesive agent B-1: Urethane-based adhesive agent (Product name A525/A50, produced by Mitsui Chemicals Polyurethane, Inc.)
(Metallic Foil Layer 13)
  Metallic foil C-1: Soft aluminum foil 8079 material (produced by Toyo Aluminum Company, thickness 40 μm)
(Corrosion Prevention Treatment Layer 14)
  Treatment agent D-1: Treatment agent for coating type ceria sol treatment, consisting mainly of cerium oxide, phosphoric and acrylic resin
(Second Adhesive Layer 15)
  Adhesive resin E-1: Polypropylene resin graft-modified with maleic acid anhydride (Product name Admer, Mitsui Chemicals Company)
(Sealant Layer 16)
  Film F-1: A film where an inner surface of a non-stretched polypropylene film (thickness 40 μm) was subjected to corona treatment

[Preparation of Outer Package Material]

On one of surfaces of the metallic foil C-1 to form the metallic foil layer 13, the treatment agent D-1 was applied by coating, followed by drying to form the corrosion treatment layer 14. Next, to the opposite surface, which was opposite to the surface where the corrosion prevention treatment layer 14, of the metallic foil layer 13, any one of the bases A-1-A4 was adhered by a dry lamination method using the adhesive agent B-1. Thereby, the base layer 11 was layered through the first adhesive layer 12. Thereafter, aging at 60° C. for six days was performed. Subsequently, the adhesive resin E-1 was extruded by an extrusion apparatus on the surface where the corrosion prevention treatment layer 14 was formed in the obtained laminate, thereby forming the second adhesive layer 15, followed by performing sandwich laminating by adhering the film F-1 thereto. As a result, the sealant layer 16 was formed. After that, the obtained laminate was subjected to thermal compression bonding under conditions of 160° C., 4 kg/cm$^2$ and 2 m/minute to prepare the outer package material 1.

[Tensile Evaluation]

Regarding each film employed in the base layer 11, after standing of a specimen of the base layer 11 under a condition of 23° C. and 40% RH for 24 hours, tensile test (15 mm in specimen width, 50 mm in distance between gauge points, and 100 mm/minute in tensile rate) was carried out under an environment of 23° C. and 40% RH. Thus, the tensile elongation and the tensile stress in the MID direction and the TD direction were measured.

[Evaluation of Moldability]

The outer package material obtained in each Example was cut into blank shape (planar shape) of 150 mm×190 mm, followed by being subjected to cold molding under a molding environment of 23° C. and 40% RH while the molding depth was changed. Thereby, the moldability was evaluated.

As a punch, there was used a die having a shape of 100 mm×150 mm and being 1.5 mm in punch corner R (RCP), 0.75 mm in punch shoulder R (RP), 0.75 mm in die shoulder R (RD). The used evaluation criteria were as follows.

Excellent: Deep drawing of molding depth of 7 mm or more can be performed without occurrence of any breaking and crack in the outer package material 1.

Good: Deep drawing of molding depth of from not less than 5 mm to less than 7 mm can be performed without occurrence of any breaking and crack in the outer package material 1.

Unsatisfactory: Breaking or crack occurs in the outer package material 1, when deep drawing of molding depth of less than 5 mm is performed.

[Evaluation of Warpage after Molding]

The outer package material obtained in each Example was cut into blank shape (planar shape) of 120 mm×260 mm such that a direction in which the tensile elongation obtained in the tensile evaluation was large formed the long side. The cut outer package material was subjected to cold molding under a molding environment of 23° C. and 40% RH to the molding depth of 4 mm.

The molding area was determined such that the end (the outer edge of the outer package material cut into the planar shape) of the outer package material cut into the blank shape and a side of the outer periphery of the molding area were separated 25 mm away from each other. The molding area was formed adjacent to the outer edge on one side portion of the outer package material cut into the blank shape (the outer package material cut into the planar shape). That is, the molding area was formed at a position where three sides of the periphery edge of the outer package material and three sides of the outer periphery of the molding area were separated 25 mm away from each other.

As a punch, there was used a die having a shape of 70 mm×80 mm and being 1.5 mm in punch corner R (RCP), 0.75 mm in punch shoulder R (RP), 0.75 mm in die shoulder R (RD).

The molded outer package material was fixed to a flat reference surface such that the base layer of the molding area became the upper portion, the warpage (the distance from the reference surface) of the end side of the area where the molding area was not formed was measured after 60 minutes of molding. The warpage was evaluated according to the following evaluation criteria.

Excellent: The warpage of the outer package material was under 50 mm.

Good: The warpage of the outer package material was from not less than 50 mm to less than 100 mm.

Unsatisfactory: The warpage of the outer package material was 100 mm or more.

Example 1 and Comparative Examples 1, 2 and 3

The evaluation results of moldability and warpage are shown in Table 1.

stress in the MD direction of the base layer was 200 MPa for the base layer, lowering in warpage of the outer package material was confirmed. Also, the outer package material used in Example 1 showed excellent moldability.

On the other hand, the outer package material used in the Comparative Example 1 where the elongation in the TD direction of the base layer was 85% could not obtain sufficient moldability relative to Example 1 because of decrease in film strength due to insufficient stretching. The outer package material used in Comparative Example 2 where the elongation in the TD direction of the base layer was 45% lowered in flexibility of the film, the outer package material broke by molding.

The outer package material which was the tubular method biaxially stretched Ny film and was used in Comparative Example 3 showed an excellent result regarding the moldability. This was because the outer package material was directionally non-biased and sufficiently stretched with balance, although the tensile elongation in the TD direction of the base layer was large. On the other hand, regarding the warpage of the outer package material, the tensile stress in the MD direction of the base layer was large, 235 MPa, which led to the undesirable result.

Thus, it was confirmed that using the sequentially biaxially stretched Ny film where the tensile elongation in the TD direction of the base layer was 75% and the tensile stress in the MD direction of the base layer was 200 MPa for the base layer could decrease the warpage of the outer package material, keeping moldability of the outer package material high.

Further, it is considered that the same effects as above can be obtained not only by this condition but also, for example, by making the tensile elongation in a first direction of the base layer 75% and the tensile stress in a second direction of the base layer 200 MPa. Here, the first direction is one of the TD direction and the MD direction of the base layer, and the second direction is the other direction.

Also, it is considered that the same effects as above can be obtained, for example, by making the tensile elongation in a first direction of the base layer from not less than 50% to less than 80% and the tensile stress in a second direction of the base layer from about not less than 150 MPa to not more than 230 MPa. Here, the first direction is one of the TD direction and the MD direction of the base layer, and the second direction is the other direction.

REFERENCE SIGNS LIST

1 . . . Outer package material for a lithium-ion battery, 11 . . . Base layer, 12 . . . First adhesive layer, 13 . . . Metallic

TABLE 1

| No. | Base layer 11 | Tensile elongation (%) | | Tensile stress (MPa) | | Moldability | Warpage evaluation |
| --- | --- | --- | --- | --- | --- | --- | --- |
| | | MD | TD | MD | TD | | |
| Example 1 | A-1 | 140 | 75 | 200 | 229 | Excellent | Excellent |
| Comparative Example 1 | A-2 | 135 | 85 | 195 | 225 | Good | Excellent |
| Comparative Example 2 | A-3 | 150 | 45 | 140 | 250 | Unsatisfactory | Excellent |
| Comparative Example 3 | A-4 | 120 | 100 | 235 | 244 | Excellent | Unsatisfactory |

As shown in Table 1, in Example 1 using the sequentially biaxially stretched Ny film where the tensile elongation in the TD direction of the base layer was 75% and the tensile foil layer, 14 . . . Corrosion prevention treatment layer, 15 . . . Second adhesive layer, 16 . . . Sealant layer, 17 . . . Molding area

What is claimed is:

1. A method for producing an outer package material for a lithium-ion battery, the method comprising:
   forming a base layer by biaxially stretching a film in a sequential manner to obtain a sequentially biaxially stretched film;
   layering a first adhesive layer, a metallic foil layer, a corrosion prevention treatment layer, a second adhesive layer and a sealant layer sequentially on one of surfaces of the base layer;
   wherein
      under tensile testing conditions that a test specimen of the base layer is stored at 23° C. and 40% relative humidity (RH) for 24 hours prior to tensile testing, and the tensile testing is carried out at 23° C. and 40% RH, and the test specimen is 15 mm in width, a distance between gauge points is 50 mm, and a tensile rate is 100 mm/minute, tensile elongation being measured in a first direction and in a second direction of the specimen of the base layer relative to the length of the specimen, the first direction being a machine direction of the specimen of the base layer and the second direction being a transverse direction perpendicular to the first direction,
      a ratio of tensile elongation measured in the first direction to tensile elongation measured in the second direction is 140:75, and
      a ratio of tensile stress measured in the first direction to tensile stress measured in the second direction is 200:229.

2. The method of claim 1, further comprising:
   forming a molding area by pressing a part of the outer package material with a pressing member having a rectangular pressure surface toward a thickness direction of the outer package material.

3. The method of claim 2, further comprising:
   cutting a first portion of the outer package material into a sheet shape; and
   disposing the molding area off-center on the first portion of the outer package material.

4. The method of claim 3, further comprising:
   folding a second portion of the outer package material after molding; and
   arranging the second portion as a lid.

5. A method of forming a lithium-ion battery, comprising:
   forming a recess in the outer package material according to claim 1;
   disposing a positive electrode, a separator and a negative electrode in the recess;
   folding a first side of the outer package material to face the sealant layer;
   heat-sealing an outer edge of the folded outer package material;
   injecting an electrolytic solution into the recess from a second side of the outer package material; and
   folding the second side of the outer package material.

6. The method of claim 1, further comprising forming a recess in the outer package material by cold molding.

7. The method of claim 2, wherein a recess is formed in the molding area, and the recess is disposed closer to one edge of the outer package material than to an opposite edge.

8. The method of claim 1, wherein the second adhesive layer is thicker than the first adhesive layer.

9. The method of claim 1, further comprising:
   pressing a first portion of the outer package material, the first portion being offset from a center of the outer package material when viewed from above; and
   folding back a second portion of the outer package material such that the second portion covers at least the first portion of the outer package material.

10. The method of claim 1, wherein the base layer is anisotropic.

11. The method of claim 1, wherein a melt flow rate of an adhesive component of the second adhesive layer is 4-30 g/10 minutes at 230° C. and 2.16 kgf.

12. The method of claim 1, wherein the corrosion prevention treatment layer comprises a coating film formed by ceria sol treatment.

* * * * *